June 13, 1933. W. F. BLACK 1,913,425
DEVICE ADAPTED TO BE MOUNTED AT THE ENDS OF NET WINGS
Filed Oct. 7, 1931 2 Sheets-Sheet 1
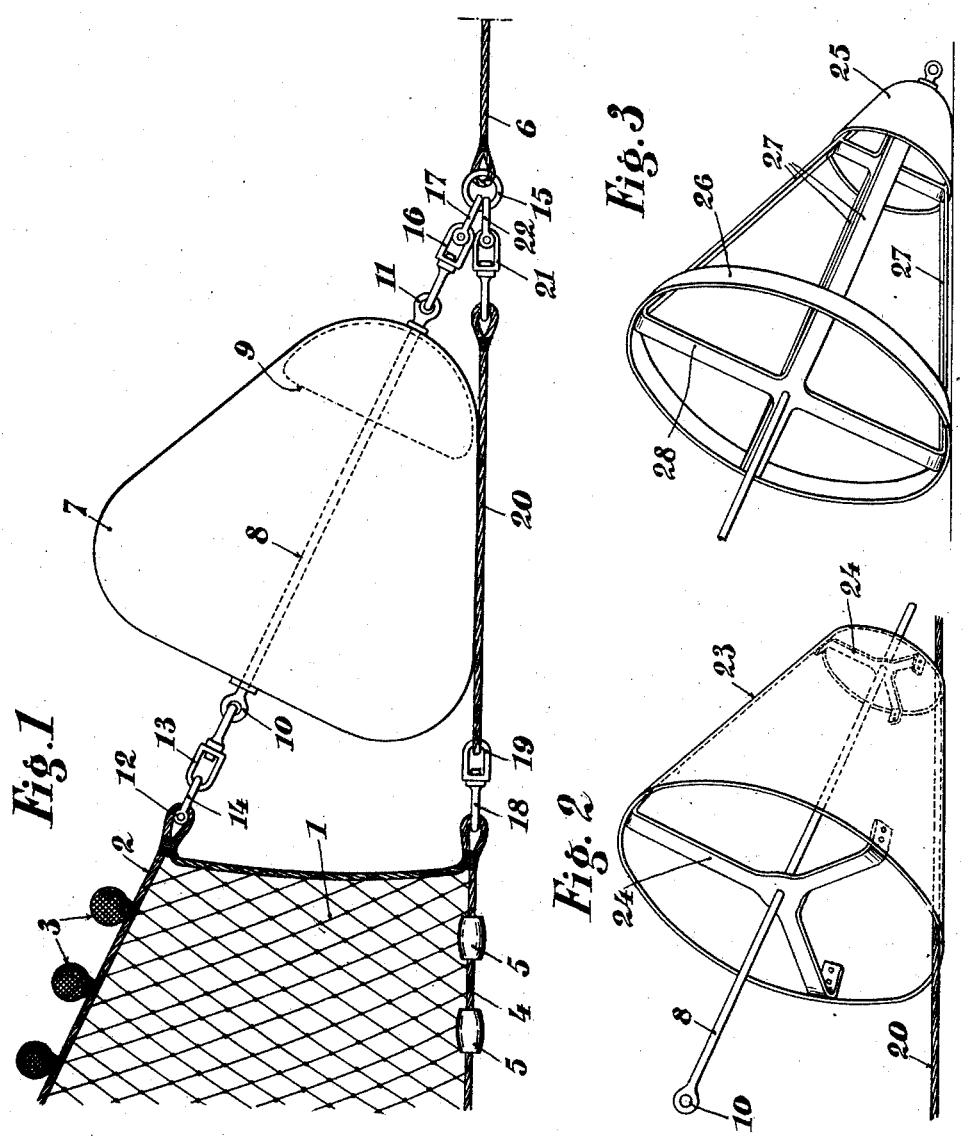
INVENTOR:
WILLIAM FORSYTH BLACK
ATTORNEYS.

June 13, 1933.  W. F. BLACK  1,913,425
DEVICE ADAPTED TO BE MOUNTED AT THE ENDS OF NET WINGS
Filed Oct. 7, 1931   2 Sheets-Sheet 2
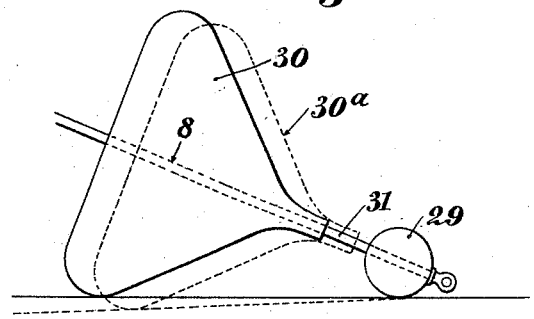
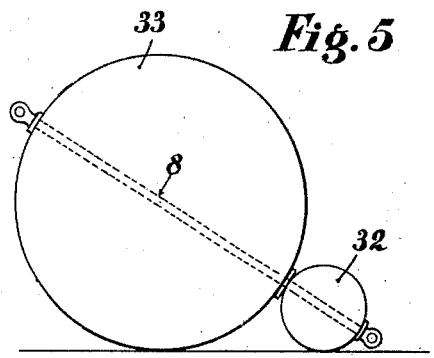
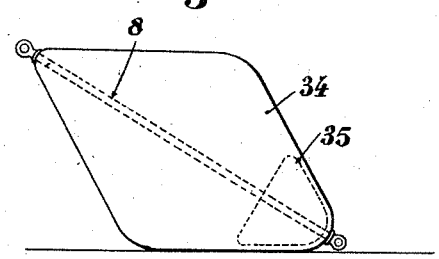
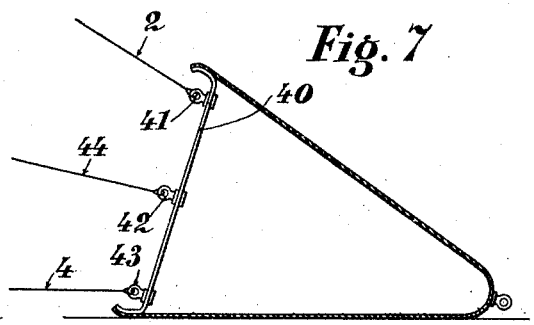
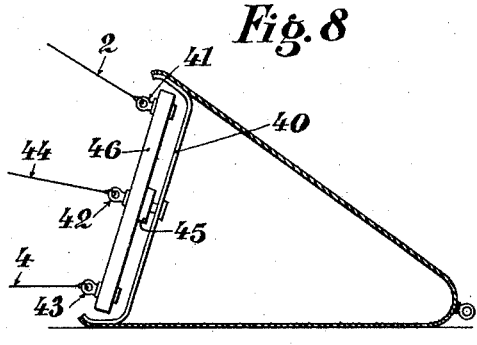
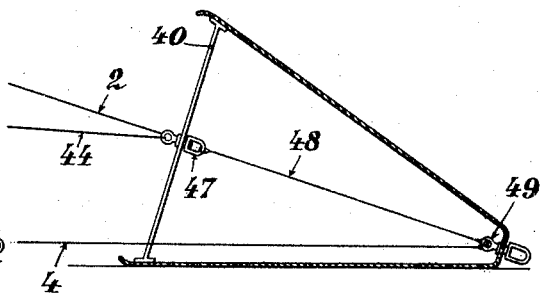
INVENTOR:
WILLIAM FORSYTH BLACK
BY Rueye & Boyne
ATTORNEYS.

Patented June 13, 1933

1,913,425

UNITED STATES PATENT OFFICE

WILLIAM FORSYTH BLACK, OF LA ROCHELLE, FRANCE, ASSIGNOR TO V. D. LIMITED, OF LONDON, ENGLAND

DEVICE ADAPTED TO BE MOUNTED AT THE ENDS OF NET WINGS

Application filed October 7, 1931, Serial No. 567,356, and in France November 4, 1930.

The invention relates to trawling gears of the V. D. type, comprising a net bulging upwardly and whose wings are connected by dragging cables of great length to shear boards securing the spreading of the gear in width.

In the fishing nets employed with such gears, the ends of the net wings are usually provided with vertical wooden slats or the like, in such manner as to keep the head rope away from the ground rope and to prevent this head rope from engaging the ground.

In order that these slats, sometimes termed "danlenos" may serve their purpose, they should constantly remain vertical, but experience shows that it is very difficult to assure the stability of such slats. The causes acting to destroy this stability are, among others: the traction exerted by the head rope on the upper end of the slat towards the interior of the net; the tilting effect due to the "crab crawling" of the slat (the direction of travel of the slat being parallel with the axis of the net, whilst the cables to which said slat is connected are situated in a vertical plane making a certain angle with the direction of travel); the catching of the base of the slat on the obstacles of the ground, or the sinking of the base of such slats in soft ground, etc.

In our "bellyless nets", which are described for instance in my prior specification No. 1,867,196 patented July 12, 1932, a slat is also used for keeping the traction cable for the rear pocket above the ground.

The present invention has for its object to provide a device serving the purpose of the ordinary slats, without having the drawbacks above indicated. For this purpose, and according to the invention, use is made of a member bounded by a surface of circular of polygonal section, preferably a surface of revolution or of streamline shape, such that, when this member rests upon a horizontal plane, its axis will be inclined and its thin end will be near the horizontal plane, said member having at its ends attaching means adapted to be connected to the head rope, to the ground rope, and eventually to the side rope or the traction cable for the rear pocket on the one hand, and to the net towing cable on the other hand.

Such a device has chiefly the following advantages:

1—Whatever be the nature of the ground and the incidents of fishing, it maintains the traction cable for the rear pocket and/or the head rope above the ground, which avoids all catching, or damage of the traction cable and/or the head rope, as well as the decrease in the fishing efficiency which would result from the sinking of the head rope.

2—By reason of the shape of revolution of this member, it readily rides or rolls upon the ground, and, due to the inclination of its axis, it readily clears the obstacles.

3—Inasmuch as it is in contact with the ground by a line of contact or by several distinct points of contact, it exerts on the ground a less pressure and does not risk of sinking into soft ground.

4—Due to the fact that the axis of this member meets the horizontal plane very near its thin end, the traction cable of the net is not raised above the ground, as occurs with the usual slats, and, owing to the great stability of this member, the traction cable of the net remains always in contact with the ground, thus preventing the escape of the flat fish under this net cable.

5—This device prevents in a quite reliable manner the entangling of the head rope and the ground rope.

The drawings shows by way of example several forms of the invention:

Fig. 1 is an elevational view of a device according to the invention as mounted at the end of a net wing.

Fig. 2 is a perspective view, showing a modification.

Fig. 3 is a view similar to Fig. 2, showing a device of open work structure.

Fig. 4 shows in elevation a device comprising a tapered member with a small ball shaped member.

Fig. 5 shows in elevation a modification comprising a large and a small ball shaped members.

Fig. 6 shows in elevation a modified device having the shape of two truncated cones connected by their large base.

Fig. 7 is a longitudinal section of a modification of Fig. 1.

Fig. 8 is a longitudinal section of a device similar to that of Fig. 7, but with a revoluble bar, and Fig. 9 is a longitudinal section of a further modification.

In Figure 1, 1 denotes the wing of a net, bordered at the upper part by a head rope 2, provided with floats 3, and at the lower part by a ground rope 4, provided with ballast leads 5. The wing of the net is drawn by a dragging cable 6, connected on the one hand to the usual shear board (not shown) and, on the other hand, to the net, through the medium of the device according to the invention; this latter comprises a member 7, having the shape of a body of revolution, for example a substantially conical body, whose axis 8 is inclined and meets the horizontal plane near the apex of the cone. In this manner, when the body 7 rests upon the ground, its axis 8 is situated substantially in line with the head rope 2. In practice, the body 7 may be constituted by a hollow or a solid block of wood, of metal, etc. preferably weighted near its narrow end, for instance by a mass of lead, as indicated at 9. The axis 8 which may consist, for example, of a rigid rod, a flexible cable, or like means, is provided at its ends with rings 10, 11, or like attaching means. Ring 10 is connected with the thimble 12 of the head rope by a swivel 13 and a detachable shackle 14. The ring 11 is connected with the ring 15 of the rope 6 by a swivel 16 and a detachable shackle 17. The ground rope 4 is connected with the cable 6 by a detachable shackle 18, a swivel 19, an intermediate rope 20, a second swivel 21 and a detachable shackle 22. Due to the provision of swivels, the forces of torsion are prevented from be-being transmitted from cable 6 to the wing of the net, all entangling of the head rope 2 and of the ground rope 4 is avoided and free rotation of member 7 upon itself is secured. Due to the various removable shackles, the dismounting of the device is very easy.

Obviously, the aforesaid construction is given only by way of example. In Figure 2, for example, member 7 is constituted by a simple conical ferrule 23, strengthened at the ends by end plates, preferably apertured, so as to leave a spider 24, pierced at its centre to leave passage to rod 8. As shown, rope 20 may extend through member 23, so as to be protected thereby and to maintain the head rope and the ground rope in the same vertical plane.

To reduce the reaction of the water upon this member, the latter may be apertured for the flow of the water during the travel of the gear on the ground. As indicated in Figure 3, the device according to the invention may even be entirely of an open-work structure and may be composed for example of a weighted cap-shaped part 25, connected with a frustoconical ring 26 by rods 27 or bars located along the generatrices of a cone, ring 26 being strengthened by a spider 28.

The device may have any shape of revolution, and for example, it may be cylindrical. However, it is preferable that, when the device is placed flatwise on the ground, its axis should be inclined, as above explained. Thus, as represented in Figure 4, the device may comprise a weighted ball 29 and a tapered piece 30, mounted on a rod 31. The piece 30 may be mounted, if desired, in an adjustable manner on rod 31, in such manner as to take the position indicated by the dotted lines at 30$^a$, and to thus modify the inclination of the axis 8 with reference to the horizontal.

In Figure 5, the device comprises a weighted ball 32 and a sphere of larger diameter 33, strung over rod 8.

In Figure 6, member 34 is constituted by two joined cones, traversed by the rod 8 carrying a weight 35. It may also have other forms, different from those indicated, such as an ellipsoidal or a paraboloidal shape or a polygonal section with many faces, etc.

In the modification of Figure 7, 40 is a cross-piece of flat bar, U iron, angle bar, etc. secured to the interior of the apparatus, near its large base, and carrying eyelets 41, 42, 43, respectively connected with the head rope 2, the side rope or rear pocket traction cable 44 and the ground rope 4. This arrangement permits of raising the head rope above the ground. In this example, the apparatus is not intended to roll upon the ground.

In the example of Figure 8, a cross-piece similar to the preceding is provided and pivotally mounted thereto at 45 is a cross-bar 46, carrying eyelets 41, 42, 43. This arrangement is such that the apparatus may roll on the ground by turning about its axis.

In Figure 9, the side rope or rear pocket traction cable 44 and the head rope 2 are attached to a swivel 47, secured to the centre of cross-bar 40 and connected by a cable or a steel wire 48 with a swivel 49, mounted at the apex of the cone and to which is attached the ground rope, which extends through the apparatus.

The various details of construction above described are obviously given only by way of example, and it will be understood that numerous modifications may be made without departing from the scope of the invention.

Rope 20 preferably consists of a neutral rope, or of a cable whose torsion is different from that of cable 6, or else by a chain.

Rod 8 may be extended for a certain distance to the rear of member 7, 23, etc., in such manner as to raise the head rope 2 by the desired amount above the ground, as shown by way of example in Figure 2.

Having now described my invention what I claim as new and desire to secure by Letters Patent is:

1. A device to be mounted at the mouth of trawl nets, which comprises a hollow sheet metal member of generally conical shape and attaching means at the opposite ends of the axis, for connection with the net mouth and to the towing device therefor, respectively.

2. A device as claimed in claim 1 wherein the apex of said conical member and the surface connecting the base with the lateral conical surface are rounded.

3. In a device as claimed in claim 1, a rod extending through said member along the axis thereof and projecting from said member at both ends, said attaching means being arranged at the ends of said rod.

4. In a device as claimed in claim 1, ballasting means within said cone, adjacent the apex thereof.

5. A device to be mounted at the mouth of trawl nets, which comprises a hollow sheet metal member of generally conical shape, a transverse bar attached to said member in the plane of its rear large base, attaching means on said bar for connection with the net mouth, and attaching means adjacent the apex of said member for connection with the towing device for said net.

6. A device to be mounted at the mouth of trawl nets, which comprises a hollow sheet metal member of generally conical shape, a transverse bar attached to said member in the plane of its rear large base, a rotary bar pivoted to said transverse bar in the axis of said conical member, attaching means on said rotary bar for connection with the net mouth, and attaching means adjacent the apex of said member for connection with the towing device for said net.

7. In a trawling gear, a net having a head rope and a net traction rope, and, on either side of said net towing means for said net, a structure having a narrow end and in which the peripheral surface elements are substantially equally distant from the axis in any cross-section at right angles with said axis, attaching means at one end of said axis for connection with said towing means and attaching means at the opposite end for connection with said head rope and net traction rope.

In testimony whereof I have signed my name to this specification.

WILLIAM FORSYTH BLACK.